Sept. 29, 1953 R. S. PENN 2,653,768
GAS BURNER CONTROL
Filed April 28, 1951
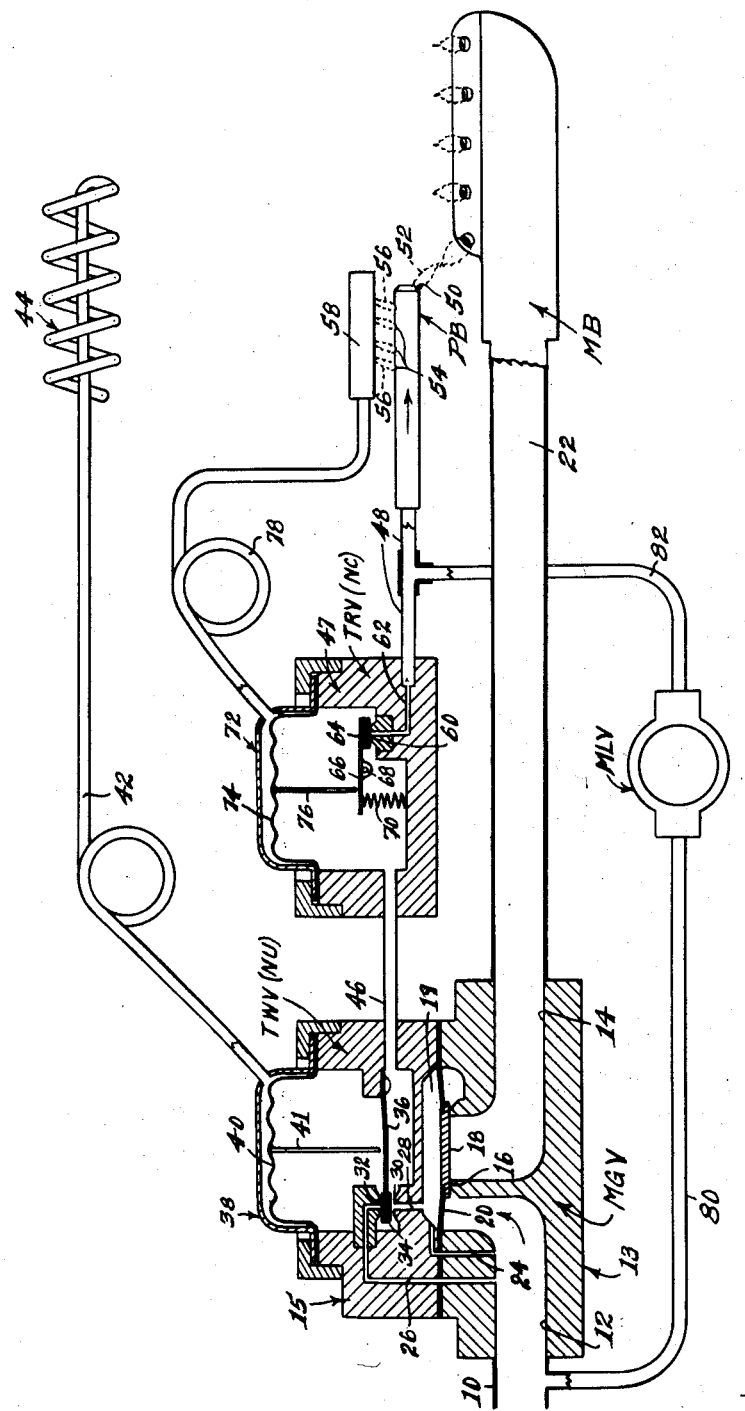
INVENTOR.
Ralph S. Penn.
By Bair, Freeman & Molinare
Attys.

Patented Sept. 29, 1953

2,653,768

UNITED STATES PATENT OFFICE 2,653,768

GAS BURNER CONTROL

Ralph S. Penn, Goshen, Ind., assignor to Penn Controls, Inc., Goshen, Ind., a corporation of Indiana Application April 28, 1951, Serial No. 223,561

8 Claims. (Cl. 236—80)

This invention relates to a combination automatic and safety gas burner control valve arrangement for controlling a burner having manual ignition for the pilot burner thereof, and a thermal responsive valve responding to the pilot burner to shut down the main burner in case the pilot burner goes out.

One object of the invention is to provide a control which permits (1) The use of an automatic main gas control valve for the dual purpose of a safety shut-off valve and an intermittent control valve responsive to temperature (2) Continuous flow of gas to the pilot line regardless of the position of the temperature control valve; and (3) The extinction of the pilot flame resulting in shutting off the pilot burner at the thermal responsive valve which prevents further flow of pilot gas and simultaneously closes the main valve.

The arrangement, therefore, provides complete shut-off which is required of devices in control of burners when heavier than air gases are used as fuel.

Another object of the invention is to provide a main gas valve which is actuated by the gas pressure and the gas pressure is controlled by a three-way valve responsive to temperature of the oven or other space being heated by the main burner.

Still another object is to provide a gas control valve of diaphragm type, the diaphragm being forced to the closed position whenever one vent line is closed by the action of a thermally responsive valve. This is a safety pilot function exclusively insofar as the thermally responsive valve is intended as responsive only to a pilot flame.

A further object is to provide a snap action temperature controlled selector valve of three-way type and having two positions, either position connecting the gas supply to the pilot line going to the pilot burner. Accordingly, regardless of the position of this valve, gas always flows through the pilot line to supply the pilot burner.

Still a further object is to provide an arrangement which makes it possible to automatically select from two alternate and equal sources of gas supply (one which passes through a diaphragm chamber wherein the gas pressure is effective to close the main valve, and the other of which bypasses the diaphragm chamber and therefore merely provides for the continuous flow of gas through the pilot line regardless of the position of the temperature controlled selector valve), the gas to supply the pilot burner.

An additional object is to provide a control which includes a valve in the gasline leading to the main burner, the port in the valve being closed by a diaphragm forming a chamber in the valve on the side of the diaphragm opposite the port to the burner. A bypass orifice leads from the inlet side of the control to the chamber and out to a pilot burner line. Another line leads from the inlet side of the valve and this line and a line leading from a chamber in the valve are controlled by a diaphragm which is actuated by a temperature bulb. The two lines are adapted to alternating control by the diaphragm and are arranged so that gas issuing therefrom flows to the pilot light, being controlled by a thermal responsive valve.

With these and other objects in view, my invention consists in the construction, arrangement and combination of the various parts of my gas burner control, whereby the objects contemplated are attained, as hereinafter more fully set forth, pointed out in my claims and illustrated in the accompanying drawing, wherein:

The figure is a diagrammatic view of my control for gas burners and shows the various parts in the cold position.

On the accompanying drawing I have used the reference numeral 10 to indicate a gas supply line. A main gas valve MGV is connected therewith and includes a body 13. A three-way valve TWV (normally up—"NU") is mounted on the main gas valve and includes a body 15.

The body 13 has an inlet 12 and an outlet 14. A valve seat 16 is located between the inlet and the outlet. A valve disc 18 is adapted to be seated against the seat 16 by gas pressure on top of a diaphgram 20 which supports the valve disc 18. The chamber above the diaphragm may be called a diaphragm chamber and is indicated at 19. A gas line 22 extends from the outlet 14 to the main burner shown at MB.

The valve bodies 13 and 15 are provided with two passageways 24 and 26 which are substantially equal in cross section and a third passageway 28 slightly larger in cross section. The passageway 26 terminates in a valve seat 32 and the passageway 28 terminates in a valve seat 30, both within the valve body 15. A valve disc 34 is adapted to selectively seat on the seats 30 and 32 and is mounted on a spring mounting blade 36 which is biased upwardly and is preferably of snap acting type.

A power element 38 of the diaphragm type is mounted on the valve body 15 and includes an actuating diaphragm 40. A stem 41 extends therefrom for coaction with the spring mounting blade 36 when temperature rise drives the diaphragm downwardly. The power element 38 is connected by a capillary tube 42 to a temperature sensing element or bulb 44 located within the oven or other space being heated by the main burner MB.

A pilot line 46 extends from the valve body 15 to a thermally responsive valve TRV having a valve body 47. The pilot line has an extension 48 from the valve body 47 to a pilot burner PB.

The pilot burner PB is provided with an ignition flame orifice 50 from which an ignition flame 52 is adapted to project when the pilot burner is lit. Since the drawing shows the parts in the cold position the ignition flame 52 is shown dotted. The pilot burner PB is also provided with heater flame orifices 54. A flame 56 for heating a temperature responsive element 58 is shown dotted, projecting from the orifices 54.

The thermally responsive valve TRV (normally closed—"NC") has a valve seat 60. A passageway 62 leads therefrom to the extension pilot line 48. A valve disc 64 is adapted to coact therewith and normally does so under the action of a spring 70, the valve being mounted on an arm 66 which is pivoted at 68.

The valve disc 64 is adapted to be spaced from the valve seat 60 by a power element 72 of the diaphragm type, its actuating diaphragm being shown at 74. A stem 76 extends from the diaphragm 74 for coacting with the lever 66 upon temperature rise affecting the diaphragm. A capillary tube 78 extends from the power element 72 to the thermally responsive element 58.

A manual lighting valve MLV is provided having conduits 80 and 82 connected therewith, the conduit 80 leading from the gas supply 10 (or it may lead from the interior of the valve body 47) and the conduit 82 leading from the valve MLV to the extension pilot line 48 and from thence to the pilot burner PB.

*Practical operation*

When the main burner MB is out, the parts of the control will be in the position shown on the drawing. Gas through the passageway 24 enters the diaphragm chamber 19 and builds up pressure therein to retain the diaphragm in its lower position with the valve disc 18 seated on the seat 16, the gas being backed up by the valve 64 which is in the closed position. Since 18 is seated on 16, no gas flows to the main burner MB.

To light the burner, the operator depresses the manual light valve MLV permitting gas to flow through 82 and 48 to the pilot burner PB. He then manually lights the pilot burner.

The flames 56 impinging on the temperature responsive element 58 causes it to actuate the diaphragm 74 for opening the valve 64 with respect to its seat 60. The ignition flame 52 of course extends toward the burner MB for igniting it. Gas now flows from the pilot line 46 through the valve 60—64 and to the pilot burner so that the manual light valve MLV may now be released and the pilot burner continues to burn under normal conditions.

Since the valve 60—64 is open, there will be a pressure drop in the valve body 47 and also in the valve body 15. Also there is a pressure drop in the diaphragm chamber 19 through the passageway 28 and the valve seat 30, the passageway 28 being slightly larger than the passageway 24 for this purpose. This results in opening of the valve disc 18 with respect to the valve seat 16 due to the predominating pressure under the diaphragm 20 from the inlet 12.

Gas now flows to the main burner MB and is ignited by the ignition flame 52. As the temperature rises in the oven or other space to be heated, the temperature sensing element 44 will actuate the diaphragm 40 for driving the stem 41 downwardly and thereby transferring the valve disc 34 from the seat 32 to the seat 30. As already mentioned, this is a snap acting type of valve so that it quickly moves from its upper position to its lower position.

Now that the seat 30 is closed by the valve 34, there will be a build up of pressure in the diaphragm chamber 19 for closing the disc 18 with respect to the seat 16 and thus shutting off the gas to the main burner.

After the temperature of the heated space has lowered to a predetermined point, the diaphragm 40 will rise high enough to permit the spring mounting blade 36 to move upwardly in response to its bias, snapping from the valve seat 30 to the valve seat 32. If the pilot burner PB is still lit so as to keep the valve disc 64 off the seat 60, then the pressure in the diaphragm chamber 19 will be led off to the pilot burner and the main gas valve MGV will again open for again supplying gas to the burner where it is re-ignited from the ignition flame 52.

Thus a substantially constant temperature is maintained in the space being heated by the main burner MB by means of a simple automatic three-way thermal responsive valve acting as a pilot for the main gas valve and turning it off and on depending on whether the temperature goes above any predetermined point at which the valve TWV is set or goes below such predetermined point.

As long as the pilot burner PB remains properly lighted, the automatic control of the main burner MB is maintained, but in the event the pilot burner goes out, the temperature sensing element 58 will cool so as to permit the diaphragm 74 to return upwardly thus permitting the spring 70 to close the valve 64—60. Thereupon a back pressure develops between this valve and the diaphragm chamber 19 so that the pressure in the chamber builds up to substantially the pressure in the supply line 10 and recloses the valve 18 against the seat 16. The valve TRV thereby acts as a safety to retain the valve 18 closed in case of pilot burner failure.

At all times gas is permitted to flow into the pilot line 46 from either the passageway 24 or the passageway 26, thus maintaining the pilot burner PB in operation regardless of whether the main gas valve MGV is closed or open as a result of responding to the temperature sensing element 44.

Some changes may be made in the construction and arrangement of the parts of my gas burner control without departing from the real spirit and purpose of my invention, and it is my intention to cover by my claims any modified forms of structure or use of mechanical equivalents which may be reasonably included within their scope.

I claim as my invention:

1. A gas burner control, comprising a main gas valve having a valve seat and a valve disc, a gas pressure responsive diaphragm for opening and closing said valve disc relative to said valve seat.

said main gas valve being provided to supply gas to a main burner, a diaphragm chamber for said diaphragm and constantly receiving gas from a gas supply line, a three-way valve having a common connection to a pilot line and selective connections to the gas supply line and to said diaphragm chamber, said latter connection when effective bleeding gas from said diaphragm chamber faster than it constantly receives gas from said gas supply line, said selective connection being normally in position to receive gas from said diaphragm chamber and being temperature responsive to the space being heated by said main burner to assume its opposite position, a pilot burner receiving gas from said pilot line, and a manual light valve for independently supplying gas to said pilot line for permitting manual lighting of said pilot burner.

2. In a gas burner control, a diaphragm actuated main gas valve for supplying gas to a main burner, said main gas valve having a diaphragm chamber constantly receiving gas from a gas supply line, a pilot line, a pilot burner receiving gas from said pilot line, a three-way valve having a common connection to said pilot line and selective connections to the gas supply line and to said diaphragm chamber, said selective connection being normally in position to receive gas from said diaphragm chamber at a greater rate than the chamber receives gas from the gas supply line and conduct it to said pilot burner and being responsive to the temperature of the space being heated by said main burner to assume its opposite position for trapping gas in said diaphragm chamber and supplying gas to said pilot burner through said selective connection from said gas supply line.

3. In a gas burner control, a main gas valve having a valve seat and a valve disc, a gas pressure responsive diaphragm for opening and closing said valve disc relative to said valve seat, said main gas valve being provided to supply gas to a main burner, a diaphragm chamber constantly receiving gas from a gas supply line, a pilot line, a three-way valve having a common connection to said pilot line and selective connections to the gas supply line and to said diaphragm chamber, said selective connection being normally in position to receive gas from said diaphragm chamber and being temperature responsive to the space being heated by said main burner to assume its opposite position, a thermal responsive valve in said pilot line, a pilot burner receiving gas from said pilot line and said thermal responsive valve, said last valve being normally closed and having a temperature sensing element adjacent said pilot burner for opening said thermal responsive valve whenever the pilot burner is lit and closing it when the pilot burner is out, and a manual light valve for supplying gas to said pilot burner independent of said main gas valve.

4. In a gas burner control, a main gas valve having a valve seat and a valve disc, a gas pressure responsive diaphragm for opening and closing said valve disc relative to said valve seat, said main gas valve being provided to supply gas to a main burner, a diaphragm chamber constantly receiving gas from a gas supply line, a pilot line, a three-way valve having a common connection to said pilot line and selective connections to the gas supply line and to said diaphragm chamber, said selective connection being normally in position to receive gas from said diaphragm chamber and being temperature responsive to the space being heated by said main burner to assume its opposite position, a thermal responsive valve in said pilot line, a pilot burner receiving gas from said pilot line and said thermal responsive valve, said last valve being normally closed and having a temperature sensing element adjacent said pilot burner which opens said thermally responsive valve whenever the pilot burner is lit and closes it when the pilot burner becomes extinguished.

5. In a gas burner control, a main gas valve having a valve seat and a valve disc for coaction therewith, said main gas valve being connected with a gas supply line and having an outlet connected with a burner, a diaphragm for supporting said valve disc and actuating the disc in respect to said seat, a diaphragm chamber adjacent said diaphragm, a three-way valve having a common connection to a pilot line and a pair of selective connections, one to the gas supply line and the other to said diaphragm chamber, a continuously open passageway leading from the gas supply line to said diaphragm chamber, said last passageway and the connection to said first selective seat being substantially equal in area, the connection from said diaphragm chamber to the second seat being somewhat larger in area, said three-way valve being normally in position with said diaphragm chamber open to said pilot line, and being temperature responsive to close when the space being heated by said burner has attained a predetermined temperature, said pilot line then being connected through the other selective seat directly to the gas supply line, a pilot burner connected with said pilot line and having an ignition flame for the burner, and a thermal responsive valve interposed in the pilot line and being normally closed, said thermal responsive valve being opened by temperature rise and having a temperature sensing element responsive to a heating flame from said pilot burner whereby to close said thermal responsive valve when the pilot burner fails and thus back up the pressure in said three-way valve and said diaphragm chamber to effect closure of said main gas valve.

6. In a burner control of the character disclosed, a diaphragm actuated main gas valve connected with a gas supply line and having an outlet connected with a burner, a diaphragm chamber adjacent the diaphragm of said main gas valve, a pilot line, a three-way valve having a common connection to said pilot line and a pair of selective connections, one to the gas supply line and the other to said diaphragm chamber, a continuously open passageway leading from the gas supply line to said diaphragm chamber, said last passage and the connection to said first selective seat being substantially equal in area, the connection from said diaphragm chamber to the second seat being somewhat larger in area, said three-way valve being normally in position with said diaphragm chamber open to said pilot line and being temperature responsive to close when the space being heated by said burner has attained a predetermined temperature, said pilot line then being connected through the other selective seat directly to the gas supply line, a pilot burner connected with said pilot line and having an ignition flame for the burner, a thermal responsive valve interposed in the pilot line and being normally closed, said thermal responsive valve having a temperature sensing element responsive to said pilot burner whereby to close said thermal responsive valve when the pilot burner fails and to thereby effect closure of said main gas valve.

7. In a burner control of the character disclosed, a diaphragm actuated main gas valve connected with a gas supply line and having an outlet connected with a burner, a diaphragm chamber adjacent the diaphragm of said main gas valve, a pilot line, a three-way valve having a common connection to said pilot line and a pair of selective connections, one to the gas supply line and the other to said diaphragm chamber, a passageway leading from the gas supply line to said diaphragm chamber, said three-way valve being normally in position with said diaphragm chamber open to said pilot line and being temperature responsive to close when the space being heated by said burner has attained a predetermined temperature, said pilot line then being connected through the other selective seat directly to the gas supply line, a pilot burner connected with said pilot line and having an ignition flame for the burner, a thermal responsive valve interposed in the pilot line, said thermal responsive valve having a temperature sensing element responsive to said pilot burner whereby to close said thermal responsive valve when the pilot burner fails to effect closure of said main gas valve.

8. In a gas burner control, a main gas valve having a valve seat and a valve disc for coaction therewith, said main gas valve being connected with a gas supply line and having an outlet connected with a burner, a diaphragm for supporting said valve disc and actuating the disc in respect to said seat, a pilot line, a diaphragm chamber adjacent said diaphragm, a three-way valve having a common connection to said pilot line and a pair of selective connections, one to the gas supply line and the other to said diaphragm chamber, a passageway leading from the gas supply line to said diaphragm chamber for constantly supplying gas thereto, said last passageway and the connection to said first selective seat being substantially equal in area, the connection from said diaphragm chamber to the second seat being somewhat larger in area, said three-way valve being normally in position with said diaphragm chamber open to said pilot line, and being temperature responsive to close when the space being heated by said burner has attained a predetermined temperature, said pilot line then being connected through the other selective seat directly to the gas supply line, a pilot burner connected with said pilot line and having an ignition flame for the burner, a thermal responsive valve interposed in said pilot line and being normally closed, said thermal responsive valve being opened by temperature rise at a heating flame from said pilot burner whereby to close said thermally responsive valve when the pilot burner fails and thus back up the pressure in said three-way valve and said diaphragm chamber to effect closure of said main gas valve, and a manual light valve for supplying gas to said pilot burner where it may be ignited and affect said temperature responsive element of said thermally responsive valve, thereupon opening it to permit thereafter automatic operation of said gas burner control to turn on and off the burner and to prevent it from being turned on if the pilot burner fails between the on periods of the burner.

RALPH S. PENN.

References Cited in the file of this patent
UNITED STATES PATENTS

| Number | Name | Date |
|---|---|---|
| 2,185,423 | Anderson | Jan. 2, 1940 |
| 2,461,615 | Taylor | Feb. 15, 1949 |
| 2,512,173 | Ray | June 20, 1950 |